United States Patent
Sakurada et al.

(10) Patent No.: US 11,198,312 B2
(45) Date of Patent: Dec. 14, 2021

(54) METHOD FOR DETERMINING WORKING GAP, AND RECORDING DEVICE

(71) Applicant: SEIKO EPSON CORPORATION, Tokyo (JP)

(72) Inventors: Kazuaki Sakurada, Nagano (JP); Tetsuo Tatsuda, Nagano (JP); Yuichi Shikagawa, Nagano (JP); Mamoru Ukita, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/775,427

(22) Filed: Jan. 29, 2020

(65) Prior Publication Data

US 2020/0247159 A1    Aug. 6, 2020

(30) Foreign Application Priority Data

Jan. 31, 2019   (JP) .............................. JP2019-015332

(51) Int. Cl.
*B41J 25/308* (2006.01)
*B41J 11/00* (2006.01)
*B41J 19/14* (2006.01)
*G11B 7/007* (2006.01)

(52) U.S. Cl.
CPC ......... *B41J 25/308* (2013.01); *B41J 11/0035* (2013.01); *B41J 11/0095* (2013.01); *B41J 19/142* (2013.01); *G11B 7/00781* (2013.01)

(58) Field of Classification Search
CPC .... B41J 25/308; B41J 11/0095; B41J 11/0035
See application file for complete search history.

(56) References Cited

U.S. PATENT DOCUMENTS

| | | | | |
|---|---|---|---|---|
| 6,461,064 B1* | 10/2002 | Leonard | ................... | B41J 11/42 347/33 |
| 9,216,603 B1* | 12/2015 | Mizes | ................... | B29C 64/393 |
| 2013/0258368 A1* | 10/2013 | Shigemoto | ............... | H04N 1/60 358/1.9 |
| 2013/0300795 A1 | 11/2013 | Ogasawara | | |
| 2016/0366288 A1* | 12/2016 | Sasa | ........................ | G01J 3/027 |

FOREIGN PATENT DOCUMENTS

| | | |
|---|---|---|
| JP | 2000-321028 A | 11/2000 |
| JP | 2011-115962 A | 6/2011 |
| JP | 2013-233708 A | 11/2013 |

* cited by examiner

*Primary Examiner* — Matthew Luu
*Assistant Examiner* — Kendrick X Liu
(74) *Attorney, Agent, or Firm* — Global IP Counselors, LLP (57) ABSTRACT

A method for determining a working gap includes a first recording step for ejecting ink from a recording head onto a first recording medium to record a test pattern, a first imaging step for capturing the test pattern recorded on the first recording medium in each of a state where a distance between the recording head and the first recording medium is a first distance, and a state where a distance between the recording head and the first recording medium is a second distance, a function calculating step, a second recording step for recording the test pattern on a second recording medium, a second imaging step for capturing the test pattern recorded on the second recording medium, and a working gap determining step for determining, based on the number of pixels of the captured test pattern and a function, a distance between the recording head and the second recording medium.

5 Claims, 8 Drawing Sheets

METHOD FOR DETERMINING WORKING GAP, AND RECORDING DEVICE

The present application is based on, and claims priority from JP Application Serial Number 2019-015332, filed Jan. 31, 2019, the disclosure of which is hereby incorporated by reference herein in its entirety.

BACKGROUND

1. Technical Field

The present disclosure relates to a method for determining a working gap, and a recording device.

2. Related Art

In related art, a recording device is known that records an image on a recording medium by ejecting ink onto the recording medium from a recording head provided with nozzles. For example, in JP-A-2013-233708, an inkjet recording device is disclosed as a recording device in which it is possible to adjust a distance between a recording head and a support surface that supports a recording medium.

However, in the recording device disclosed in JP-A-2013-233708, a working gap, which is a distance between the recording head and the recording medium, can be calculated in relation to the recording medium having a known medium thickness, but there is a problem that the working gap cannot be calculated in relation to the recording medium for which the thickness of the medium is unknown.

SUMMARY

A method for determining a working gap of the present application includes a first recording step for ejecting ink from a recording head onto a first recording medium having a known medium thickness to record a test pattern, a first imaging step for capturing the test pattern recorded on the first recording medium in each of a state where a distance between the recording head and the first recording medium is a first distance, and a state where a distance between the recording head and the first recording medium is a second distance, a function calculating step for calculating, based on the number of pixels of the test pattern captured at the first distance and the number of pixels of the test pattern captured at the second distance, a function to determine the distance based on the number of pixels of the captured test pattern, a second recording step for recording the test pattern on a second recording medium, a second imaging step for capturing the test pattern recorded on the second recording medium, and a working gap determining step for determining, based on the number of pixels of the captured test pattern and the function, a distance between the recording head and the second recording medium.

In the above-described method for determining the working gap, preferably, the test pattern is a pattern that is recorded by relative movement, along a first axis, of the recording head and one of the first recording medium and the second recording medium, and is used for adjusting a recording position along the first axis.

In the above-described method for determining the working gap, preferably, the first distance is a lower limit of the distance between the recording head and the first recording medium, and the second distance is an upper limit of the distance between the recording head and the first recording medium.

In the above-described method for determining the working gap, preferably, at the first distance of the first imaging step, the test pattern is enlarged or reduced to a predetermined size.

In the above-described method for determining the working gap, preferably the recording head includes a first recording head and a second recording head, in the second recording step, the test pattern is recorded, by the first recording head, onto the second recording medium, in the second imaging step, the test pattern recorded on the second recording medium is captured, and in the working gap determining step, a distance between the first recording head and the second recording medium is determined based on the number of pixels of the captured test pattern and the function, and a distance between the second recording head and the second recording medium is determined based on the distance between the first recording head and the second recording medium and the function for the second recording head.

A recording device of the present application includes a recording head configured to record a test pattern, a gap adjustment unit configured to adjust a height of the recording head, an imaging unit configured to capture the test pattern, and a control unit. The control unit records the test pattern on a first recording medium having a known medium thickness, captures the test pattern recorded on the first recording medium in each of a state where a distance between the recording head and the first recording medium is a first distance, and a state where a distance between the recording head and the first recording medium is a second distance, calculates, based on the number of pixels of the test pattern captured at the first distance and the number of pixels of the test pattern captured at the second distance, a function to determine the distance based on the number of pixels of the captured test pattern, records the test pattern on a second recording medium, captures the test pattern recorded on the second recording medium, and determines, based on the number of pixels of the captured test pattern and the function, a working gap that is a distance between the recording head and the second recording medium.

DESCRIPTION OF EXEMPLARY EMBODIMENTS

Exemplary embodiments of the present disclosure will be described below with reference to the accompanying drawings. Note that in the drawings, apart from FIG. 2, FIG. 3, and FIG. 8, for convenience of explanation, an X-axis, a Y-axis, and a Z-axis are illustrated as three axes orthogonal to one another. A leading end side of an arrow illustrating each of the axes is defined as a "positive side", and a base end side is defined as a "negative side". Additionally, in line with a direction of gravity, the positive side of the Z-axis is referred to as an "upper side" and the negative side of the Z-axis is referred to as a "lower side". The X-axis corresponds to a first axis, and is also referred to as a main scanning direction. The Y-axis is also referred to as a transport direction. Further, a positional relationship along the transport direction of a recording medium W is also referred to as "upstream" or "downstream".

1. Embodiment

Figure 1:
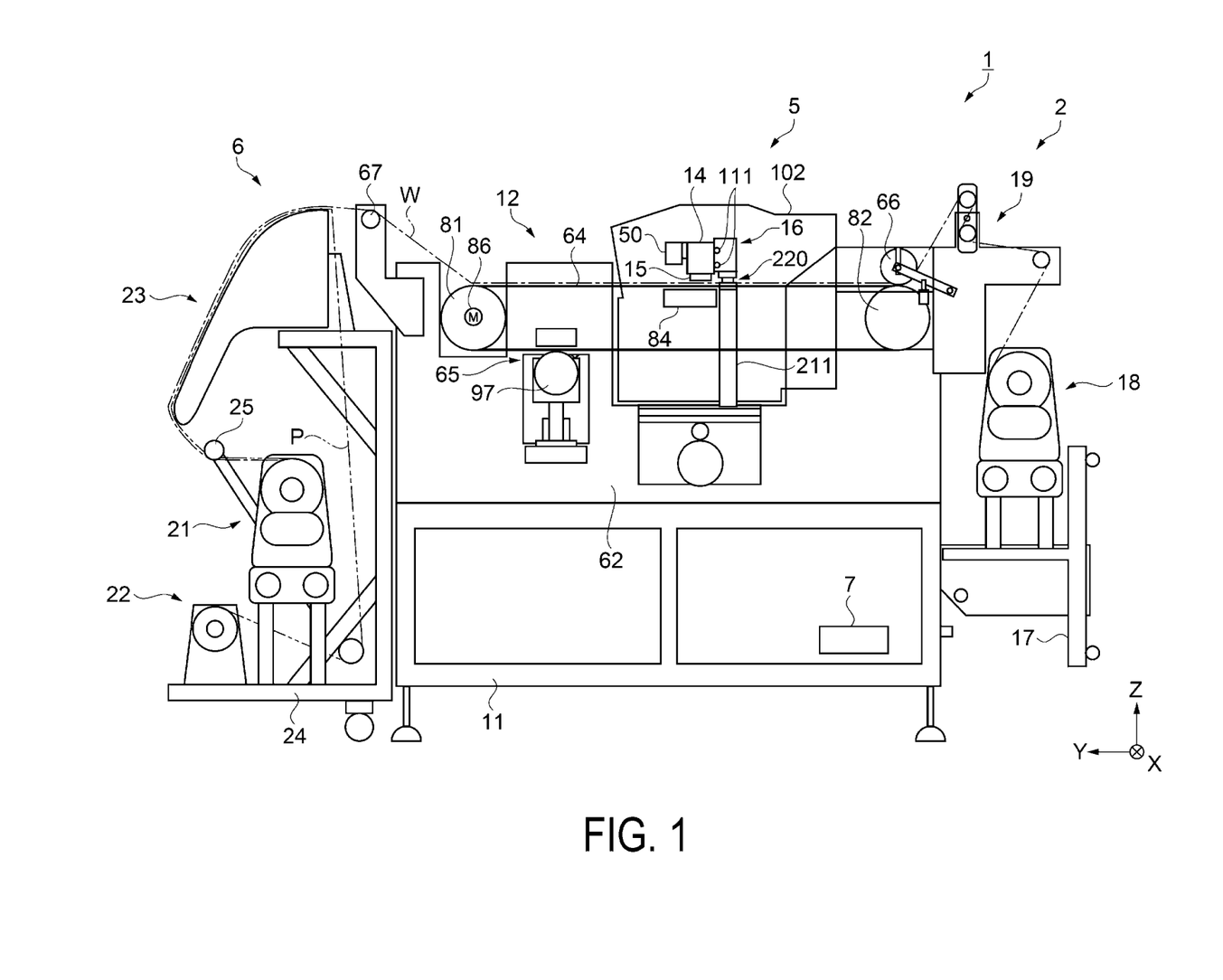
FIG. 1 is a schematic cross-sectional view illustrating an outline overall configuration of a recording device according to an embodiment.

FIG. 1 is a schematic cross-sectional view illustrating an outline overall configuration of a recording device according to an embodiment. First, the outline configuration of a recording device 1 according to the embodiment will be described with reference to FIG. 1. Note that, in the embodiment, the recording device 1 is exemplified that is used for performing textile printing on the recording medium W by supplying the long recording medium W, such as a fabric, in a roll-to-roll manner, and recording images and the like using an inkjet method.

As illustrated in FIG. 1, the recording device 1 is provided with a feeding portion 2 that feeds out and transfers the recording medium W, a medium transport unit 12 that transports the recording medium W in the transport direction, a recording unit 5 that performs recording on the recording medium W in cooperation with the medium transport unit 12, a winding portion 6 that retrieves the recording medium W, and a cleaning unit 65. Then, the recording device 1 includes a control unit 7 that performs overall control of each of these components.

First, a path of the recording medium W from the feeding portion 2 to the winding portion 6 will be described.

The feeding portion 2 is mounted on a feeding frame 17 provided upstream of the medium transport unit 12 in the transport direction of the recording medium W. The feeding portion 2 includes a feeding unit 18 that holds the band-like recording medium W wound in a roll shape and feeds out the recording medium W to the medium transport unit 12, and a slack-eliminating unit 19 that eliminates slack in the fed out recording medium W. For example, a fabric such as cotton, wool, polyester, or the like is used as the recording medium W.

The medium transport unit 12 supplies the recording medium W fed out from the feeding portion 2 to the recording unit 5. The medium transport unit 12 is supported by a pair of side frames 62 having a flat surface formed by a Y-axis and a Z-axis, the side frames 62 being fixed on a main body platform 11 configured by assembling steel materials. The medium transport unit 12 includes a driving roller 81 positioned downstream in the transport direction, a driven roller 82 positioned upstream in the transport direction, and a transporting belt 64 that is stretched between the driving roller 81 and the driven roller 82. The driving roller 81 and the driven roller 82 have an axis along the X-axis and are rotatably supported on the pair of side frames 62 via a dedicated bearing. A transport motor 86 is coupled to a first axial end of the driving roller 81, as a power source for intermittently moving the transporting belt 64.

The transporting belt 64 is formed in an endless shape by coupling both ends of a band-like belt, which is wider than the width of the recording medium W. A top surface of the transporting belt 64 is provided with an adhesive layer onto which the recording medium W is adhered. The transporting belt 64 is held between the driving roller 81 and the driven roller 82, in a state in which a predetermined tension acts thereon. A press roller 66, which presses the recording medium W supplied from the feeding portion 2 and overlaid on the transporting belt 64 so as to adhere the recording medium W to the transporting belt 64, is provided corresponding to an upstream section of the transporting belt 64. When the transport motor 86 is driven, the transporting belt 64 transports the recording medium W adhered to the transporting belting 64 by the press roller 66 in the transport direction. In this way, images and the like can be recorded on the fabric that has elasticity. After being subject to the recording by the recording unit 5, the recording medium W is transported in the transport direction, is separated from the transporting belt 64 by a separating roller 67 provided downstream of the medium transport unit 12, and is relayed to the winding portion 6. Note that in the above description, the transporting belt 64 is provided with the adhesive layer to which the recording medium W is adhered, but the transporting belt 64 is not limited to this example. For example, the transporting belt may be an electrostatic attraction-type belt that attracts the recording medium W using static electricity.

The winding portion 6 is installed on a winding unit platform 24 provided downstream of the medium transport unit 12 in the transport direction of the recording medium W. The winding portion 6 includes a winding unit 21 for winding and retrieving the recorded recording medium W onto a core member in a roll shape. Further, the winding portion 6 includes a heater unit 23 that, before the recording medium W is wound, vaporizes a solvent of the ink that has permeated into the recording medium W, and a slip sheet unit 22 that supplies a slip sheet P to the back surface of the recording medium W being supplied to the heater unit 23. The winding portion 6 is provided with a tension roller 25 that presses the back surface of the recording medium W hanging down from the heater unit 23 under its own weight, and that applies tension to the recording medium W being wound by the winding unit 21. The winding unit 21 is provided with a winding motor (not illustrated) that supplies rotary power to the core member. In this way, the belt-like recording medium W on which the images and the like are recorded can be wound onto the winding unit 21.

Next, the recording unit 5 will be described.

The recording unit 5 is disposed higher than the medium transport unit 12. The recording unit 5 includes a head moving unit 16, a carriage 14 that is caused to reciprocate, by the head moving unit 16, in the main scanning direction that is a width direction of the recording medium W intersecting the transport direction, a recording head 15 mounted on the carriage 14, and a printer cover 102 covering the head moving unit 16, the carriage 14, and the recording head 15.

Figure 4:
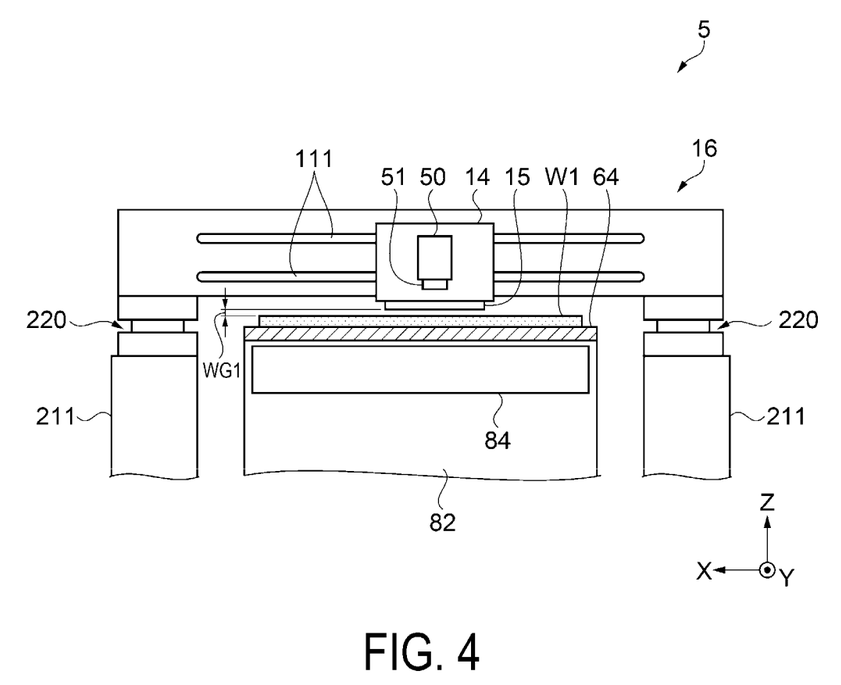
FIG. 4 is a diagram illustrating the working gap.

The head moving unit 16 is formed in a beam shape, and is provided between a pair of recording unit support portions 211 that are provided standing vertically on the outer side of the transporting belt 64 along the X-axis (see FIG. 4). The head moving unit 16 is provided with two carriage guides 111 that slidably support the carriage 14 along the main scanning direction, and a carriage motor (not illustrated) as a power source that causes the carriage 14 to reciprocate along the carriage guides 111. As a result of the driving of the carriage motor, the recording head 15 is guided by the carriage guides 111 along with the carriage 14, and reciprocates in the main scanning direction.

The recording head 15 includes nozzle rows corresponding to a plurality of colors for color recording, and inks of each of the colors are supplied from ink tanks (not illustrated). A platen 84 that supports the recording medium W placed on the transporting belt 64 is provided at a position facing the recording head 15. The recording head 15 ejects ink from each of the nozzle rows toward the recording medium W on the platen 84. Further, an imaging unit 50 that captures the image or the like recorded on the recording medium W is provided on a downstream surface of the carriage 14. The imaging unit 50 includes a lens, and an imaging element (not illustrated) that converts light entering from the lens into an electrical signal. The imaging unit 50 of the embodiment is provided with a zoom lens 51 (see FIG. 4), which is a lens capable of changing an imaging range 52 (see FIG. 5) by varying the focal length.

A gap adjustment unit 220 is provided between the head moving unit 16 and the recording unit support unit 211 supported by the main body platform 11. The gap adjustment unit 220 expands and contracts along the Z-axis, and adjusts the height of the recording head 15 by raising and lowering the entire recording unit 5 with respect to the medium transport unit 12 provided on the main body platform 11, that is, with respect to the transporting belt 64. As a result, a working gap, which is a distance between a nozzle surface of the recording head 15 and the recording medium W placed on the transporting belt 64, can be adjusted. For example, a mechanism including a combination of a ball screw and a ball nut, a linear guide mechanism, or the like may be employed as the gap adjustment unit 220. Note that the configuration of the gap adjustment unit 220 described in the embodiment is an example, and a configuration may be adopted in which a gap adjustment unit using a cam mechanism or the like is incorporated into a carriage.

Note that in the embodiment, the recording head 15 is exemplified as being a so-called serial recording head type that is mounted on the reciprocating carriage 14 and ejects the ink while moving along the main scanning direction. However, the recording head 15 may be a so-called line recording head type in which recording heads are fixedly arranged so as to extend in the width direction of the recording medium W.

The cleaning unit 65 is provided below the medium transport unit 12. The recording medium W is separated, and the cleaning unit 65 cleans, from below, the top surface of the transporting belt 64 moving from the driving roller 81 to the driven roller 82. The cleaning unit 65 includes a rotating brush 97 that is driven to rotate while in contact with the transporting belt 64, and removes ink, fabric fibers, or the like adhered to the top surface of the transporting belt 64.

Further, a maintenance unit (not illustrated) is provided at one end in the width direction along the X-axis of the transporting belt 64. In plan view from the positive side of the Z-axis, the maintenance unit is provided at a position overlapping with the recording head 15 that reciprocates along the X-axis. The maintenance unit includes a suction portion that sucks ink from the nozzles of the recording head 15, a wiping portion that performs wiping to remove the ink adhered to the nozzle surface of the recording head 15, a flushing portion that performs flushing to eject the ink from the nozzles of the recording head 15, and the like.

Figure 2:
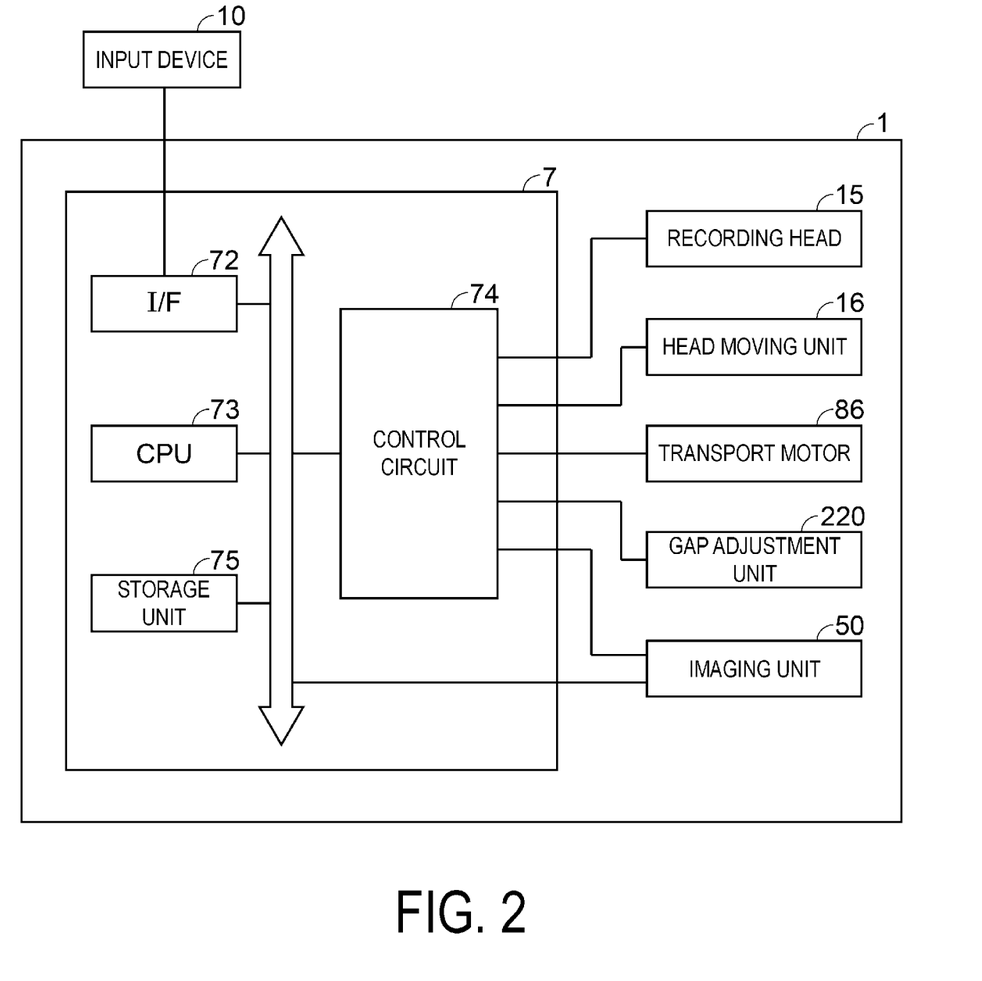
FIG. 2 is a block diagram illustrating electrical coupling of the recording device.

Next, an electrical configuration of the recording device 1 will be described with reference to FIG. 2. FIG. 2 is a block diagram illustrating electrical coupling of the recording device.

The recording device 1 records images and the like on the recording medium W based on recorded data input from an input device 10. The input device 10 may be a personal computer or the like, and may have a configuration in which it is provided in the same housing as the recording device 1. The input device 10 controls jobs causing the recording device 1 to perform the recording, and controls the recording device 1 in coordination with the control unit 7 of the recording device 1. Software operated by the input device 10 includes general image processing application software for handling image data and printer driver software for generating recording data that causes the recording device 1 to perform the recording.

The recording device 1 includes the control unit 7 that controls each of the units and portions provided in the recording device 1. The control unit 7 includes an interface unit (I/F) 72, a CPU 73, a control circuit 74, a storage unit 75, and the like. The interface unit 72, the storage unit 75, and the control circuit 74 are electrically coupled to the CPU 73 via a bus.

The interface unit 72 is configured to transmit and receive data between the input device 10, which handles input signals and images, and the control unit 7. For example, the interface unit 72 receives recording data and the like generated by the input device 10.

The CPU 73 is an arithmetic processing device for performing various types of input signal processing, and overall control of the recording device 1 in accordance with a program stored in the storage unit 75 and the recording data received from the input device 10. The CPU 73 determines the working gap, which is the distance between the recording head 15 and the recording medium W, and which will be described later.

The storage unit 75, which serves as a storage medium that secures a program storage region, a working region, and the like of the CPU 73, includes a storage element, such as a Random Access Memory (RAM), an Electrically Erasable Programmable Read Only Memory (EEPROM), or the like.

The control circuit 74 is electrically coupled to the recording head 15, the head moving unit 16, the transport motor 86 that rotates the drive roller 81, and the like. The control circuit 74 generates control signals for controlling the recording head 15, the head moving unit 16, the transport motor 86, and the like, based on the recording data and calculation results of the CPU 73.

Further, the control circuit 74 is electrically coupled to the gap adjustment unit 220. The control circuit 74 generates control signals for extending and contracting the gap adjustment unit 220, based on a height of the recording head 15 input to the input device 10.

Further, the control circuit 74 is electrically coupled to the imaging unit 50. The imaging unit 50 is electrically coupled to the CPU 73 via a bus. The control circuit 74 generates control signals for controlling the imaging unit 50. Based on the control signals generated by the control circuit 74, the imaging unit 50 captures a test pattern 53 recorded on a first recording medium W1 or a second recording medium W2 to be described later, converts the captured test pattern 53 into an electrical signal, and transmits the electrical signal to the CPU 73.

Based on control signals output from the control circuit 74, the control unit 7 records a raster line of dots aligned along the X-axis, by performing main scanning, in which the carriage 14 is moved along the X-axis that is the main scanning direction while ejecting the ink from the nozzle rows. Further, based on control signals output from the control circuit 74, the control unit 7 performs sub scanning, by moving the recording medium W along the Y-axis that is the transport direction. By alternately performing the main scanning and the sub scanning, a desired image based on the recording data is recorded on the recording medium W.

Figure 3:
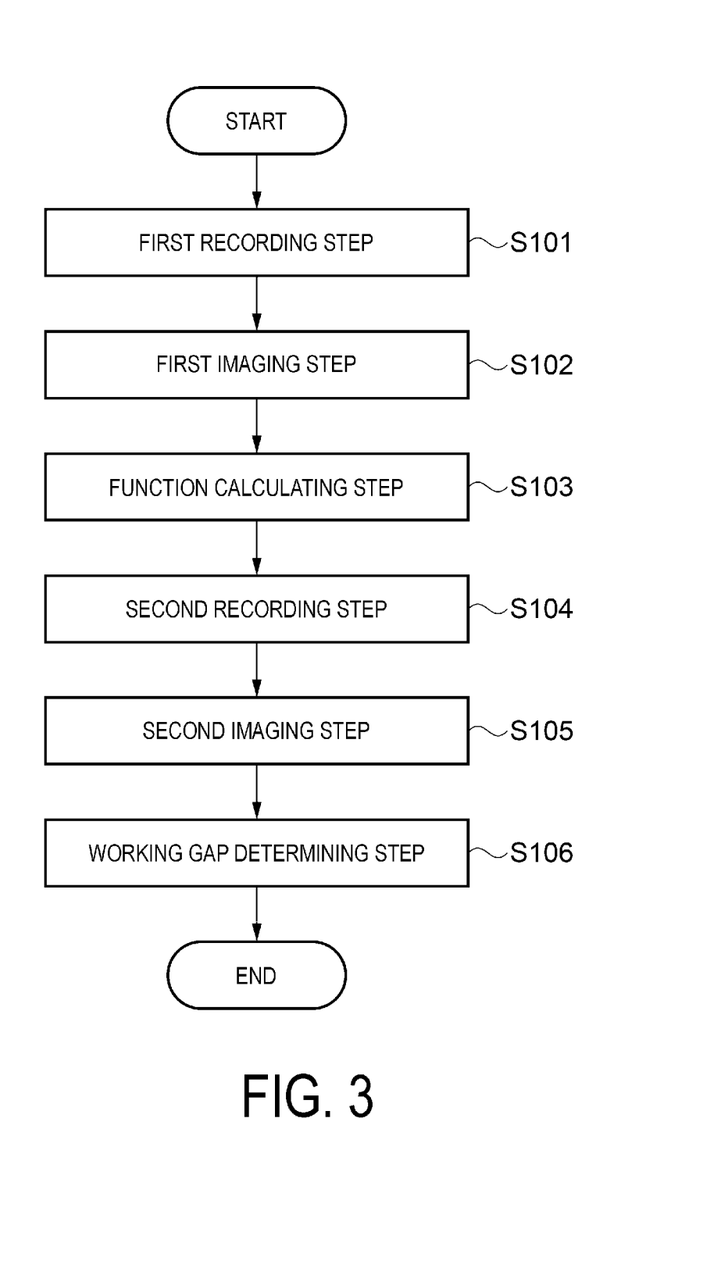
FIG. 3 is a flowchart illustrating a method for determining a working gap.
Figure 5:
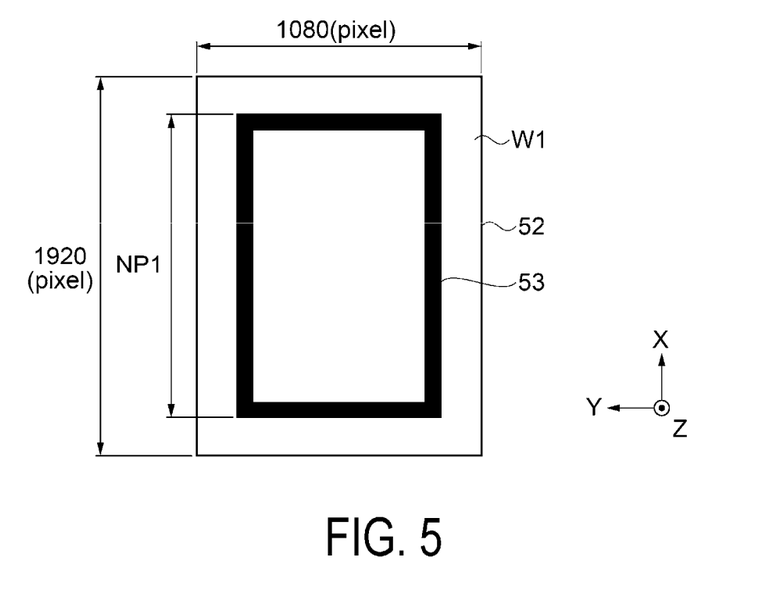
FIG. 5 is a diagram illustrating a test pattern captured by an imaging unit.
Figure 6:
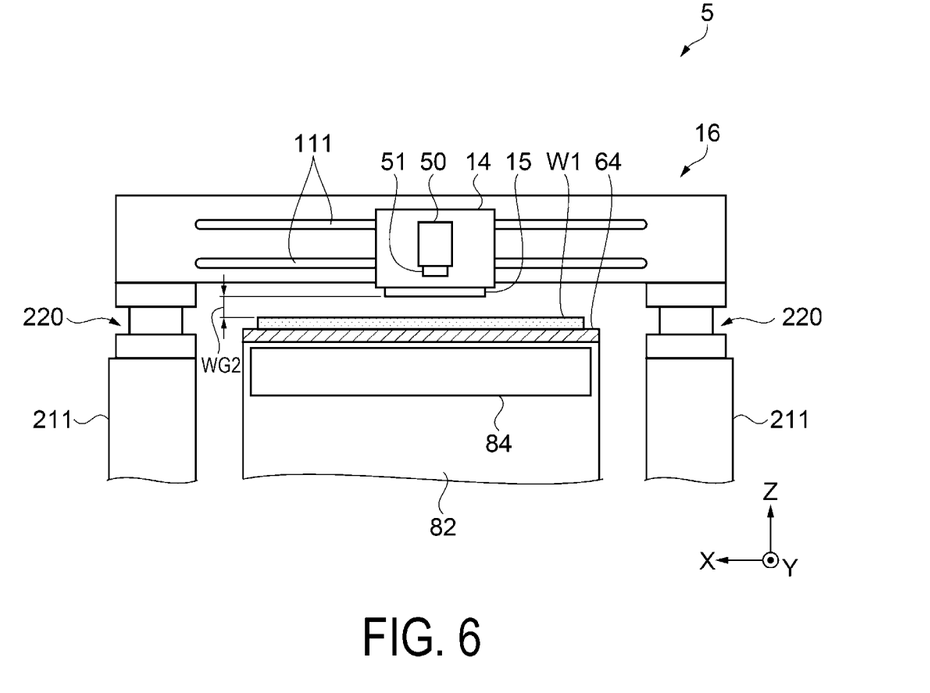
FIG. 6 is a diagram illustrating the working gap.
Figure 7:
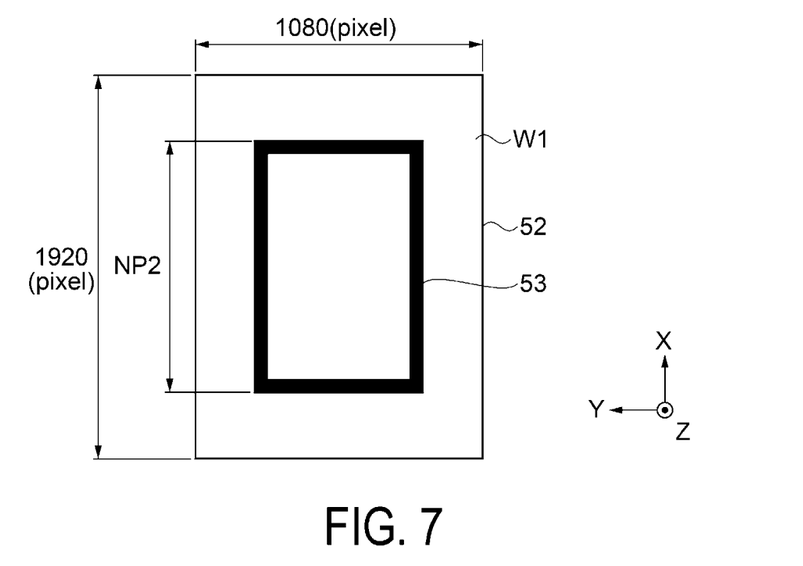
FIG. 7 is a diagram illustrating the test pattern captured by the imaging unit.
Figure 8:
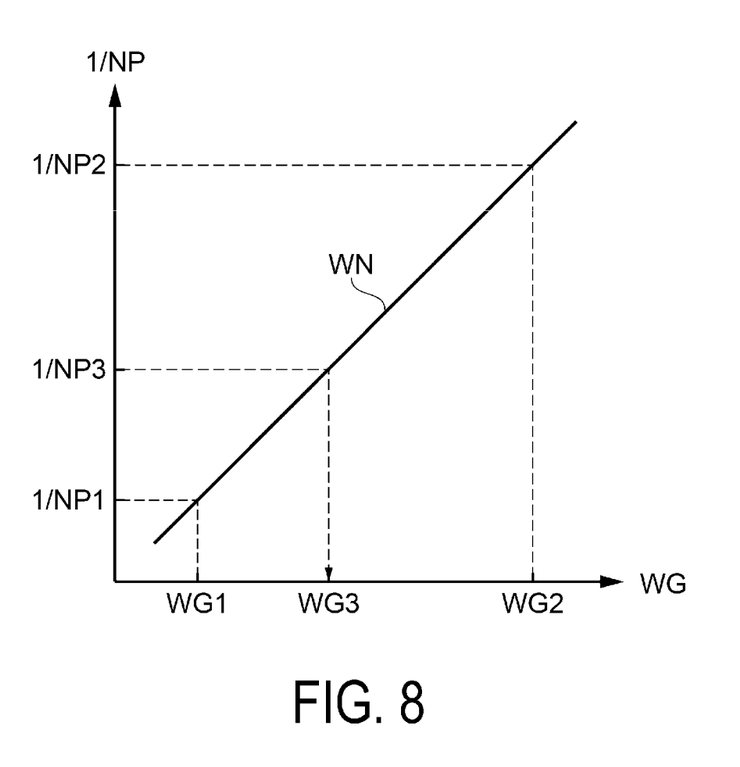
FIG. 8 is a diagram illustrating a relationship between the number of pixels of the captured test pattern and the working gap.
Figure 9:
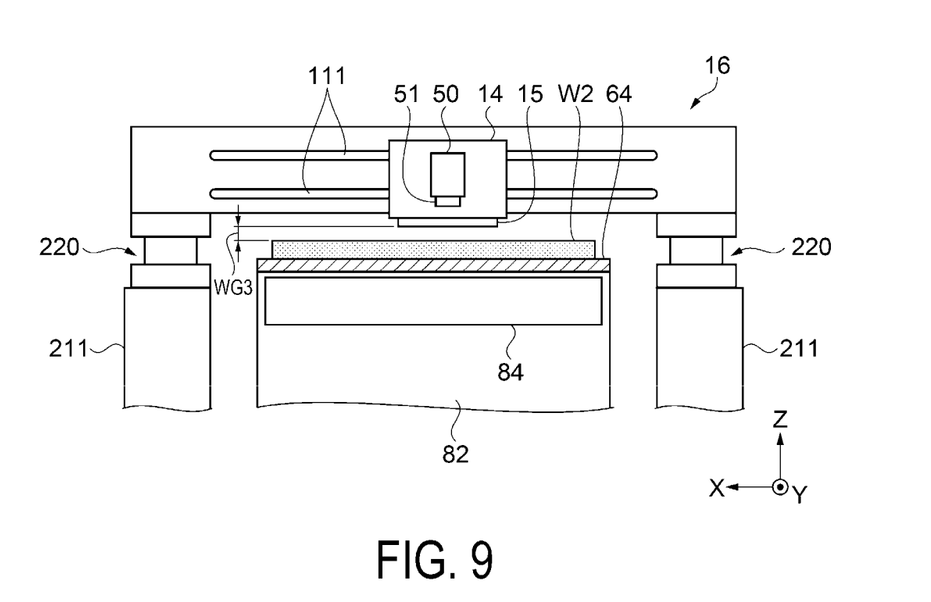
FIG. 9 is a diagram illustrating the working gap.
Figure 10:
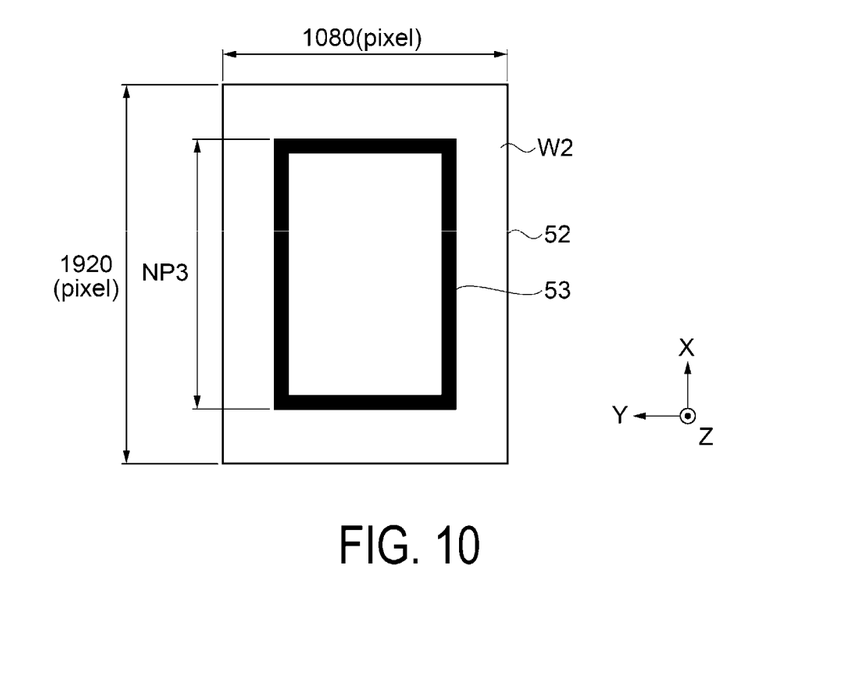
FIG. 10 is a diagram illustrating the test pattern captured by the imaging unit.

Next, a method for determining a working gap WG that is a distance between the second recording medium W2, which is the recording medium W for which the thickness of the medium is unknown, and the recording head 15 will be described with reference to FIG. 3 to FIG. 10. FIG. 3 is a flowchart illustrating the method for determining the working gap. FIG. 4, FIG. 6, and FIG. 9 are diagrams illustrating working gaps. FIG. 5, FIG. 7, and FIG. 10 are diagrams illustrating test patterns captured by the imaging unit. FIG. 8 is a diagram illustrating a relationship between the number of pixels of the captured test pattern and the working gap.

Step S101 is a first recording step in which the test pattern 53 is recorded by ejecting the ink from the recording head onto the first recording medium W1 that is the recording medium W for which the thickness of the medium is known. The control unit 7 controls the transport motor 86 and transports the first recording medium W1 to a position facing the recording head 15. The control unit 7 controls the head moving unit 16 and moves the carriage 14 from a first side to a second side along the X-axis. In this way, the recording head 15 and the first recording medium W1 move relative to each other along the X-axis. When moving the carriage 14, the control unit 7 controls the recording head 15, and records the test pattern 53 on the first recording medium W1 using a predetermined nozzle row. For example, the recording data that forms a frame-shaped rectangle can be employed as the test pattern 53.

Step S102 is a first imaging step in which the test pattern 53 recorded on the first recording medium W1 is captured. As illustrated in FIG. 4, the control unit 7 raises and lowers the gap adjustment unit 220, and sets the working gap WG, which is the distance between the recording head 15 and the first recording medium W1, to a first distance WG1. Using the gap adjustment unit 20, the recording head 15 is set to a specified height with respect to the transporting belt 64. Since the thickness of the medium is known for the first recording medium W1, the first distance WG1 can be determined. The first distance WG1 is preferably a lower limit at which the working gap WG can be set. The control unit 7 controls the driving of the transport motor 86 and the head moving unit 16, and causes the test pattern 53 recorded on the first recording medium W1 and the imaging unit 50 to face each other. Using the imaging unit 50, the control unit 7 captures the test pattern 53 at the first distance WG1. For example, the imaging unit 50 captures the test pattern 53 inside the imaging range 52, at 1920×1080 pixels. FIG. 5 illustrates the test pattern 53 captured at the first distance WG1.

At the first distance WG1, the test pattern 53 is enlarged or reduced to a predetermined size using the zoom lens 51 of the imaging unit 50. As the predetermined size, for example, a size along the X-axis of the test pattern 53 is set to 80% or more of the imaging range 52. In this way, any recording data other than the test pattern 53 can be handled as a test pattern. In addition, when any recording data that is smaller than the predetermined size is used as the test pattern, the accuracy of a function WN to be described below can be improved by enlarging the test pattern. A user may manually manipulate the image of the imaging unit 50 displayed on the input device 10 while viewing the image, or the control unit 7 may calculate the number of pixels of the test pattern 53 and may perform control using a control signal based on a result of the calculation.

As illustrated in FIG. 6, the control unit 7 raises and lowers the gap adjustment unit 220, and sets the working gap WG to a second distance WG2. The second distance WG2 is preferably an upper limit at which the working gap WG can be set. Using the imaging unit 50, the control unit 7 captures the test pattern 53 at the second distance WG2. FIG. 7 illustrates the test pattern 53 captured at the second distance WG2.

Step S103 is a function calculating step in which the function WN is calculated that is used to determine the working gap WG from the number of pixels NP of the captured test pattern 53, based on the number of pixels NP1 of the test pattern 53 captured at the first distance WG1 and the number of pixels NP2 of the test pattern 53 captured at the second distance WG2. The CPU 73 of the control unit 7 calculates the number of pixels NP1 of a length along the X-axis of the test pattern 53 captured at the first distance WG1, and the number of pixels NP2 of a length along the X-axis of the test pattern 53 captured at the second distance WG2. As illustrated in FIG. 8, the CPU 73 calculates the function WN that is used to determine the working gap WG from the number of pixels NP, based on the number of pixels NP1 of the test pattern 53 with respect to the first distance WG1 and the number of pixels NP2 of the test pattern 53 with respect to the second distance WG2, and stores the calculated function WN in the storage unit 75. The vertical axis in FIG. 8 indicates inverse numbers of the number of pixels NP of the test pattern 53, and the horizontal axis indicates the working gap WG. The function WN is a straight line on which the inverse number of the number of pixels NP and the working gap WG are proportional to each other. By setting the first distance WG1 as the lower limit of the working gap WG and the second distance WG2 as the upper limit of the working gap WG, that is, by increasing the difference between the first distance WG1 and the second distance WG2, accuracy when calculating the function WN can be improved.

Step S104 is a second recording step in which the test pattern 53 is recorded on the second recording medium W2, which is the recording medium W for which the thickness of the medium is unknown. The control unit 7 controls the transport motor 86 and transports the second recording medium W2 to the position facing the recording head 15. As illustrated in FIG. 9, the control unit 7 raises and lowers the gap adjustment unit 220, and sets the distance between the recording head 15 and the second recording medium W2 to a third distance WG3, which is the desired working gap WG. Using the gap adjustment unit 220, the recording head 15 is set to a specified height with respect to the transporting belt 64. Since the thickness of the medium of the second recording medium W2 is unknown, the third distance WG3 at the time of recording the test pattern 53 on the second recording medium W2 is also unknown. The control unit 7 controls the head moving unit 16 and moves the carriage 14 from the first side to the second side along the X-axis. As a result, the recording head 15 and the second recording medium W2 move relative to each other along the X-axis. When moving the carriage 14, the control unit 7 controls the recording head 15, and records the test pattern 53 on the second recording medium W2 using a predetermined nozzle row.

Step S105 is a second imaging step in which the test pattern 53 recorded on the second recording medium W2 is captured. The control unit 7 controls the driving of the transport motor 86 and the head moving unit 16, and causes the test pattern 53 recorded on the second recording medium W2 to face the imaging unit 50. The control unit 7 captures the test pattern 53 using the imaging unit 50, at the third distance WG3. FIG. 10 illustrates the test pattern 53 captured at the third distance WG3.

Step S106 is a working gap determining step in which the third distance WG3, which is the unknown working gap WG, is determined. The CPU 73 of the control unit 7 calculates the number of pixels NP3 of the length along the X-axis of the test pattern 53 captured in the second imaging step. Then, the CPU 73 refers to the function WN stored in the storage unit 75, and, based on the number of pixels NP3 and the function WN, determines the third distance WG3, which is the working gap WG at the time of recording the test pattern 53 on the second recording medium W2 in the second recording step. In this way, the working gap WG can be determined when using the second recording medium W2 for which the thickness of the medium is unknown. Further, the CPU 73 calculates the thickness of the second recording medium W2 based on the height of the recording head 15 with respect to the transporting belt 64 and on the third distance WG3.

Note that, in this embodiment, the description is given in which the function WN and the unknown working gap WG are determined based on the number of pixels NP of the length along the X-axis of the captured test pattern 53, but the function WN and the unknown working gap WG may be determined based on the number of pixels of a length along the Y-axis of the test pattern 53.

According to the above-described method for determining the working gap and recording device 1 of this embodiment, the following effects can be achieved.

The method for determining the working gap captures, at the first distance WG1 and at the second distance WG2, the test pattern 53 recorded on the first recording medium W1, for which the thickness of the medium is known, and, using the number of pixels NP1 and NP2 of each of the captured test patterns 53 and the first distance WG1 and the second distance WG2, calculates the function WN that determines the working gap WG based on the number of pixels NP. In this way, even when the thickness of the second recording medium W2 is unknown, the third distance WG3, which is the working gap WG at the time of recording the test pattern 53 on the second recording medium W2, can be determined based on the number of pixels NP3 of the test pattern 53 that is recorded on the second recording medium W2 and captured, and the function WN. Thus, the method for determining the working gap can be provided for determining the working gap WG of the recording medium W for which the thickness of the medium is unknown.

The first distance WG1 is preferably the lower limit of the working gap WG and the second distance WG2 is preferably the upper limit of the working gap WG. In this way, by increasing the difference between the first distance WG1 and the second distance WG2, the accuracy when determining the function WN can be improved.

The imaging unit 50 is provided with the zoom lens 51. Because the test pattern 53 is enlarged or reduced to the predetermined size by the zoom lens 51, any recording data other than the test pattern 53 can be handled as the test pattern. Further, when any recording data smaller than a predetermined size is used as the test pattern, the accuracy when determining the function WN can be improved by expanding the test pattern.

The control unit 7 of the recording device 1 captures, at the first distance WG1 and the second distance WG2, the test pattern 53 recorded on the first recording medium W1 for which the thickness of the medium is known, and, using the number of pixels NP1 and NP2 of each of the captured test patterns 53 and the first distance WG1 and the second distance WG2, calculates the function WN that determines the working gap WG based on the number of pixels NP. In this way, even when the thickness of the second recording medium W2 is unknown, the third distance WG3, which is the working gap WG at the time of recording the test pattern 53 on the second recording medium W2, can be determined based on the number of pixels NP3 of the test pattern 53 that is recorded on the second recording medium W2 and captured, and the function WN. Thus, the recording device 1 can be provided for determining the working gap WG of the recording medium W for which the thickness of the medium is unknown.

Note that, the present disclosure is not limited to the embodiment described above, and various modifications and improvements can be added to the above-described embodiment. Modified examples are described below.

2. Modified Example 1

Figure 11:
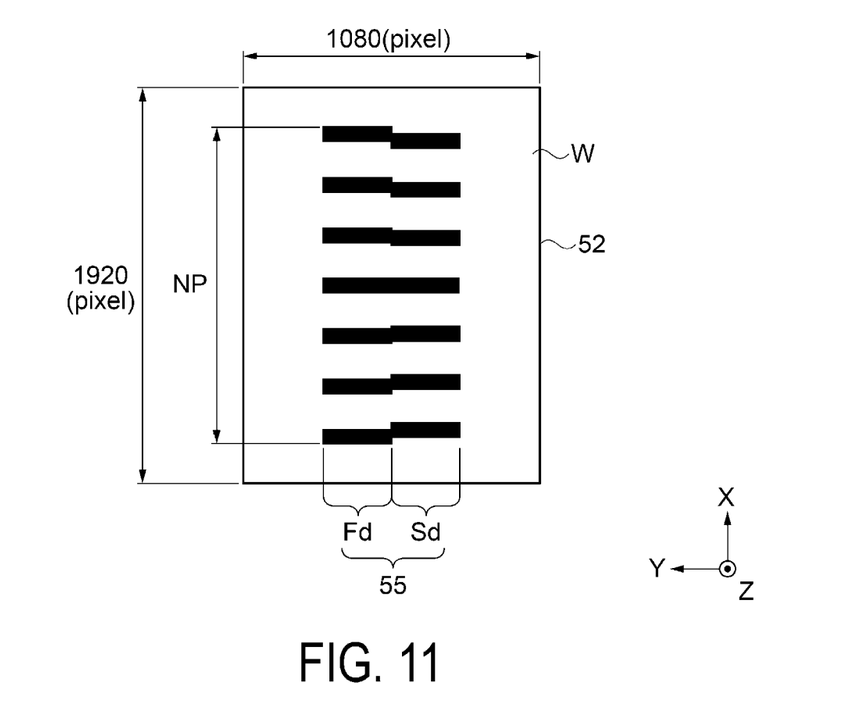
FIG. 11 is a diagram illustrating a test pattern captured by the imaging unit according to Modified Example 1.

FIG. 11 is a diagram illustrating a test pattern captured by the imaging unit according to Modified Example 1. A test pattern 55 described in Modified Example 1 differs in shape from the test pattern 53 described in the embodiment.

The test pattern 55 is a pattern used to adjust a recording position along the X-axis. As illustrated in FIG. 11, the test pattern 55 is configured by a first region Fd and a second region Sd. The first region Fd is recorded by a forward movement in which the carriage 14 moves from the first side to the second side along the X-axis. The second region Sd is recorded by a return movement in which the carriage 14 moves from the second side to the first side along the X-axis. A plurality of rectangular patterns that are long along the Y-axis are arranged at equal intervals along the X-axis in the first region Fd and the second region Sd. The interval between the rectangular patterns disposed in the first region Fd and the interval between the rectangular patterns disposed in the second region Sd are different, and one end of each of the rectangular patterns disposed in the first region Fd overlaps with one end of each of the rectangular patterns disposed in the second regions Sd.

The positions of the rectangular pattern of the first region Fd and the rectangular pattern of the second region Sd disposed in the center of the X-axis are aligned with each other on the X-axis. A degree of displacement in arrangement positions, on the X-axis, between the rectangular patterns of the first region Fd and the rectangular patterns of the second region Sd increases toward both ends of the X-axis. The test pattern 55 is recorded on the recording medium W, and the recording positions recorded along the X-axis at the forward movement and the return movement can be adjusted, using a correction value that accords with the position at which the rectangular pattern of the first region Fd and the rectangular pattern of the second region Sd are aligned on the X-axis.

In the flow of determining the working gap WG described in the embodiment, the test pattern 55 may be used instead of the test pattern 53. As illustrated in FIG. 11, the imaging unit 50 is provided with the zoom lens 51, and therefore, the test pattern 55 can be captured at a predetermined size, and the number of pixels NP of a length along the X-axis of the captured test pattern 55 can be determined. In the flow of determining the working gap WG, by using the test pattern 55, the working gap can be determined and the recording position along the X-axis can be adjusted simultaneously.

3. Modified Example 2

Figure 12:
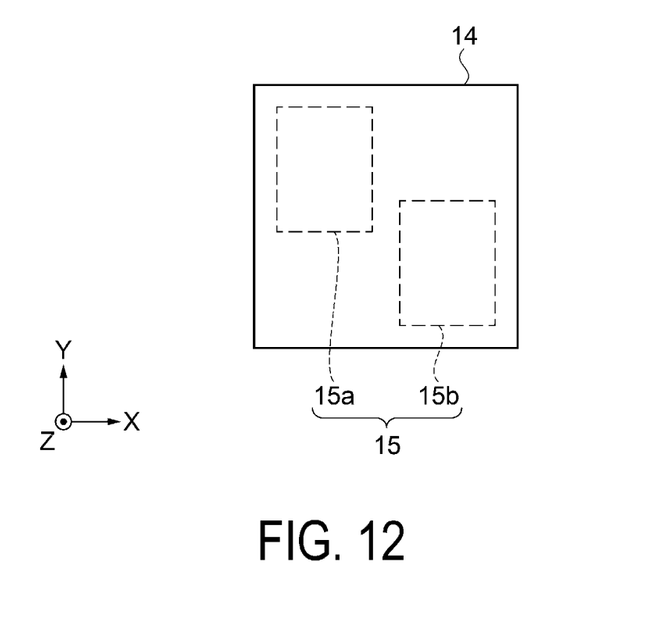
FIG. 12 is a diagram illustrating a recording head according to Modified Example 2.

FIG. 12 is a diagram illustrating the recording head 15 according to Modified Example 2. The recording head 15 of Modified Example 2 is configured by a plurality of recording heads.

As illustrated in FIG. 12, the recording head 15 includes a first recording head 15a and a second recording head 15b, and is mounted on the carriage 14. The second recording head 15b is positioned on the positive side along the X-axis and on the negative side along the Y-axis with respect to the first recording head 15a, and part of the second recording head 15b overlaps with the first recording head 15a in a side view from the X-axis direction.

When the recording head 15 has the plurality of recording heads, the working gap WG may be determined using the following steps. At S101 to S103, processing similar to the above-described example is performed for each of the first and second recording heads 15a and 15b, and a function for the first recording head 15a and a function for the second recording head 15b are obtained. At S104, the one first recording head 15a, of the plurality of recording heads, performs the recording on the second recording medium W2. At S105 and S106, processing similar to the above-described embodiment is performed for the first recording head 15a and the working gap WG3 of the first recording head 15a is determined. Then, as a new step S107, the working gap WG3 of the second recording head 15b is determined based on the working gap WG3 of the first recording head 15a and the function for the second recording head 15b.

In this way, a measurement time can be shortened by determining the working gap WG of the other recording head from the result for the first recording head. Note that the recording head 15 can achieve the same effect even in a configuration in which three or more of the recording heads are arranged along the X-axis and the Y-axis.

Contents derived from the embodiment will be described below.

A method for determining a working gap of the present application includes a first recording step for ejecting ink from a recording head onto a first recording medium having a known medium thickness to record a test pattern, a first imaging step for capturing the test pattern recorded on the first recording medium in each of a state where a distance between the recording head and the first recording medium is a first distance, and a state where a distance between the recording head and the first recording medium is a second distance, a function calculating step for calculating, based on the number of pixels of the test pattern captured at the first distance and the number of pixels of the test pattern captured at the second distance, a function to determine the distance based on the number of pixels of the captured test pattern, a second recording step for recording the test pattern on a second recording medium, a second imaging step for capturing the test pattern recorded on the second recording medium, and a working gap determining step for determining, based on the number of pixels of the captured test pattern and the function, a distance between the recording head and the second recording medium.

According to this method, the method for determining the working gap captures, at the first distance and at the second distance, the test pattern recorded on the first recording medium for which the thickness of the medium is known, and, based on the number of pixels of the test pattern captured at the first distance and at the second distance, calculates the function used to determine the working gap based on the number of pixels of the captured test pattern. In this way, even when the thickness of the second recording medium is unknown, it is possible to determine the distance between the recording head and the second recording medium, that is, the so-called working gap, based on the number of pixels of the test pattern recorded on the second recording medium and captured, and on the function. Thus, the method for determining the working gap can be provided for determining the working gap for the recording medium for which the thickness of the medium is unknown.

In the above-described method for determining the working gap, preferably, the test pattern is a pattern that is recorded by relative movement, along a first axis, of the recording head and one of the first recording medium and the second recording medium, and is used for adjusting a recording position along the first axis.

According to this method, the working gap can be determined and the recording position along the first axis can be adjusted simultaneously.

In the above-described method for determining the working gap, preferably, the first distance is a lower limit of the distance between the recording head and the first recording medium, and the second distance is an upper limit of the distance between the recording head and the first recording medium.

According to this method, by increasing the difference between the first distance and the second distance, accuracy when determining the function can be improved.

In the above-described method for determining the working gap, preferably, at the first distance of the first imaging step, the test pattern is enlarged or reduced to a predetermined size.

According to this method, any image can be treated as the test pattern for determining the working gap. Further, when any recording data that is smaller than a predetermined size is used as the test pattern, the accuracy when determining the function can be improved by enlarging the test pattern.

In the above-described method for determining the working gap, preferably the recording head includes a first recording head and a second recording head, in the second recording step, the test pattern is recorded, by the first recording head, onto the second recording medium, in the second imaging step, the test pattern recorded on the second recording medium is captured, and in the working gap determining step, a distance between the first recording head and the second recording medium is determined based on the number of pixels of the captured test pattern and the function, and a distance between the second recording head and the second recording medium is determined based on the distance between the first recording head and the second recording medium and the function for the second recording head.

According to this method, when the recording head is configured by the plurality of recording heads, such as the first recording head and the second recording head, the distance between the second recording head and the second recording medium is determined based on a result for the first recording head. In this way, a measurement time for determining the distance between each of the plurality of recording heads and the second recording medium can be shortened.

A recording device of the present application includes a recording head configured to record a test pattern, a gap adjustment unit configured to adjust a height of the recording head, an imaging unit configured to capture the test pattern, and a control unit. The control unit records the test pattern on a first recording medium having a known medium thickness, captures the test pattern recorded on the first recording medium in each of a state where a distance between the recording head and the first recording medium is a first distance, and a state where a distance between the recording head and the first recording medium is a second distance, calculates, based on the number of pixels of the test pattern captured at the first distance and the number of pixels of the test pattern captured at the second distance, a function to determine the distance based on the number of pixels of the captured test pattern, records the test pattern on a second recording medium, captures the test pattern recorded on the second recording medium, and determines, based on the number of pixels of the captured test pattern and the function, a working gap that is a distance between the recording head and the second recording medium.

According to this configuration, the control unit captures, at the first distance and the second distance, the test pattern recorded on the first recording medium for which the thickness of the medium is known, and, based on the number of pixels of the test pattern captured at the first distance and the second distance, calculates the function used to determine the working gap based on the number of pixels of the captured test pattern. In this way, even when the thickness of the second recording medium is unknown, it is possible to determine the distance between the recording head and the second recording medium, that is, the so-called working gap, based on the number of pixels when the test pattern recorded on the second recording medium is captured, and on the function. Thus, the recording device can be provided for determining the working gap for the recording medium for which the thickness of the medium is unknown.

What is claimed is:

1. A method for determining a working gap, comprising:
a first recording step for ejecting ink from a recording head onto a first recording medium having a known medium thickness to record a test pattern;
a first imaging step for capturing the test pattern recorded on the first recording medium in each of a first state where a distance between the recording head and the first recording medium is a first distance, and a second state where a distance between the recording head and the first recording medium is a second distance, an image of the test pattern to be captured in the first state being enlarged or reduced to a predetermined size in the first state, by using a zoom lens in the first imaging step;
a function calculating step for calculating, based on the number of pixels of the test pattern that has been captured at the first distance and for which the image has been enlarged or reduced in the first state, and based on the number of pixels of the test pattern that has been captured at the second distance, a function to determine the distance from the number of pixels of the captured test pattern;
a second recording step for recording the test pattern on a second recording medium;
a second imaging step for capturing the test pattern recorded on the second recording medium; and
a working gap determining step for determining, based on the number of pixels of the captured test pattern and the function, a distance between the recording head and the second recording medium.

2. The method for determining the working gap according to claim 1, wherein
the test pattern is a pattern that is recorded by relative movement, along a first axis, of the recording head and one of the first recording medium and the second recording medium, and
is used for adjusting a recording position along the first axis.

3. The method for determining the working gap according to claim 1, wherein
the first distance is a lower limit of the distance between the recording head and the first recording medium, and
the second distance is an upper limit of the distance between the recording head and the first recording medium.

4. The method for determining the working gap according to claim 1, wherein
the recording head includes a first recording head and a second recording head,
the first recording step, the first imaging step, and the function calculating step are performed for each of the first and second recording heads,
in the second recording step, the test pattern is recorded, by the first recording head, onto the second recording medium;
in the second imaging step, the test pattern recorded on the second recording medium is captured, and
in the working gap determining step, a distance between the first recording head and the second recording medium is determined based on the number of pixels of the captured test pattern and the function calculated for the first recording head, and a distance between the second recording head and the second recording medium is determined based on the distance between the first recording head and the second recording medium and the function calculated for the second recording head.

5. A recording device comprising:
a recording head configured to record a test pattern;
a gap adjustment unit configured to adjust a height of the recording head;
an imaging unit configured to capture the test pattern and including a zoom lens; and
a control unit, wherein
the control unit
records the test pattern on a first recording medium having a known medium thickness,
captures the test pattern recorded on the first recording medium in each of a first state where a distance between the recording head and the first recording medium is a first distance, and a second state where a distance between the recording head and the first recording medium is a second distance, and enlarges or reduces, in the first state, an image of the test pattern to be captured in the first state to a predetermined size, by using the zoom lens,
calculates, based on the number of pixels of the test pattern that has been captured at the first distance and for which the image has been enlarged or reduced in the first state, and based on the number of pixels of the test pattern that has been captured at the second distance, a function to determine the distance from the number of pixels of the captured test pattern, records the test pattern on a second recording medium,
captures the test pattern recorded on the second recording medium, and
determines, based on the number of pixels of the captured test pattern and the function, a working gap that is a distance between the recording head and the second recording medium.

\* \* \* \* \*